United States Patent
Dietz

(10) Patent No.: US 6,711,589 B2
(45) Date of Patent: Mar. 23, 2004

(54) METHOD OF DOING BUSINESS BY IDENTIFYING CUSTOMERS OF COMPETITORS THROUGH WORLD WIDE WEB SEARCHES OF JOB LISTING DATABASES

(75) Inventor: Timothy Alan Dietz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 09/881,923

(22) Filed: Jun. 14, 2001

(65) Prior Publication Data

US 2002/0194192 A1 Dec. 19, 2002

(51) Int. Cl.[7] ............................. G06F 7/00; G06F 17/00
(52) U.S. Cl. ....................................... 707/104.1; 707/10
(58) Field of Search ............................... 707/1, 2, 3, 4, 707/5, 10, 100, 104.1; 705/1, 10, 11, 27

(56) References Cited

U.S. PATENT DOCUMENTS

| | | | | |
|---|---|---|---|---|
| 5,416,694 A | * | 5/1995 | Parrish et al. | 705/8 |
| 5,978,768 A | * | 11/1999 | McGovern et al. | 705/1 |
| 6,363,376 B1 | * | 3/2002 | Wiens et al. | 707/3 |
| 6,438,539 B1 | * | 8/2002 | Korolev et al. | 707/3 |

* cited by examiner

Primary Examiner—Diane D. Mizrahi
(74) Attorney, Agent, or Firm—Jerry B. Kraft; Mark E. McBurney

(57) ABSTRACT

A business method for identifying business competitors' customers through Web searches of job listing databases or job boards and company Web sites where jobs are also often posted directly. Items such as competitors' business names, product names, acronyms, etc., are used as keywords and the search engine results provide an index of potential customers who are posting job listings for employees skilled in competitive products. Once the Web sites and/or Web pages posting job listings of these potential customers are located, additional information relative to doing business with said potential customers may be extracted from such pages and Web sites through "spider" or "Web crawler" routines. Such additional information may be: the potential customer locations posting said job listings to thereby identify customer locations using competitors' products; the quantity of the jobs posted in said job listings to thereby quantify the potential customers' product needs; or the names, email addresses or phone numbers of people within the potential customers' company having job needs to thereby identify potential contacts within the organization.

14 Claims, 4 Drawing Sheets

METHOD OF DOING BUSINESS BY IDENTIFYING CUSTOMERS OF COMPETITORS THROUGH WORLD WIDE WEB SEARCHES OF JOB LISTING DATABASES

TECHNICAL FIELD

The present invention relates to searching in the World Wide Web (Web), and particularly to "data mining" in the Web involving a method for identifying customers of business competitors through Web searches.

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of databases providing documents, media and computer programs through related distribution of Web documents, e.g. Web pages or electronic mail. Because of the ease with which documents are distributable via the Web, it has become a major source of data. Virtually all databases of public information throughout the world are accessible and able to be searched via the Web.

The ease with which great volumes of data may be searched from a computer attached to the Internet and equipped with a Web browser has led to the development of a type of "Web data mining" in which combinations of Web searches are used to relate fragments of data, which individually appear to be innocent and non-confidential, to those who made the data available, but when pieced together can be very valuable in what is revealed about the publishers of data or related others.

In a business environment, all companies and organizations are very concerned about prematurely releasing competitive information regarding their products, services, product plans; but, most of all, their customers or potential customers. Consequently, all papers, publications and other information released by businesses made available through the Web have usually been scrutinized by technical, business and legal functions to safeguard competitive information, especially customer data.

Conversely, in the competitive business environment, competitors in all businesses seek to get information about each other's customers through all possible legitimate processes.

SUMMARY OF THE PRESENT INVENTION

The present invention provides a method for identifying business competitors' customers through Web searching which is legitimate, fair to competitors, and in no way intrudes on unpublished or confidential information of such competitors.

The invention provides a business method for identifying business competitors' customers through Web searches of job listing databases or job boards and company Web sites where jobs are also often posted direct. Items such as competitors' business names, product names, acronyms, etc., are used as keywords, and the search engine results provide an index of potential customers who are posting job listings for employees skilled in competitive products.

It has been surprisingly found that in their efforts to hire the best employees as early as possible in commercial development efforts, the businesses being targeted by the present invention will release a considerable amount of information about their product selections, skill needs and the quantity of such needs. There appear to be at least two major factors compelling such customers to disclose what would be regarded as confidential customer list information by a competitive product supplier. First, development cycles should ideally be very short from concept to completion. Thus, companies do not have time for long employee hiring cycles when they are staffing up for projects. Thus, they are driven to publish as much information as possible in their initial job listings in the hope of quickly reaching the right potential job applicants. Second, because of product or technology specialization, a great many companies' staffing needs are difficult to fill because of high demand and limited supply, which creates a highly competitive job market for high technology skills.

Once the Web sites and/or Web pages posting job listings of these potential customers are located, additional information relative to doing business with said potential customers may be extracted from such pages and Web sites through "spider" or "Web crawler" routines that delve farther into a site's content. Such additional information may be: the potential customers' addresses and locations that are posting said job listings to thereby identify customer locations using competitors' products; the quantity of the jobs posted in said job listings to thereby quantify the potential customers' product needs; or the names, email addresses or phone numbers of people within the potential customers' company having job needs to thereby identify potential contacts within the organization.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is an illustrative flowchart describing the setting up of the process of the present invention through which the Web job listings may be searched for;

DETAILED DESCRIPTION OF THE PREFERRED EMBODIMENT

Figure 1:
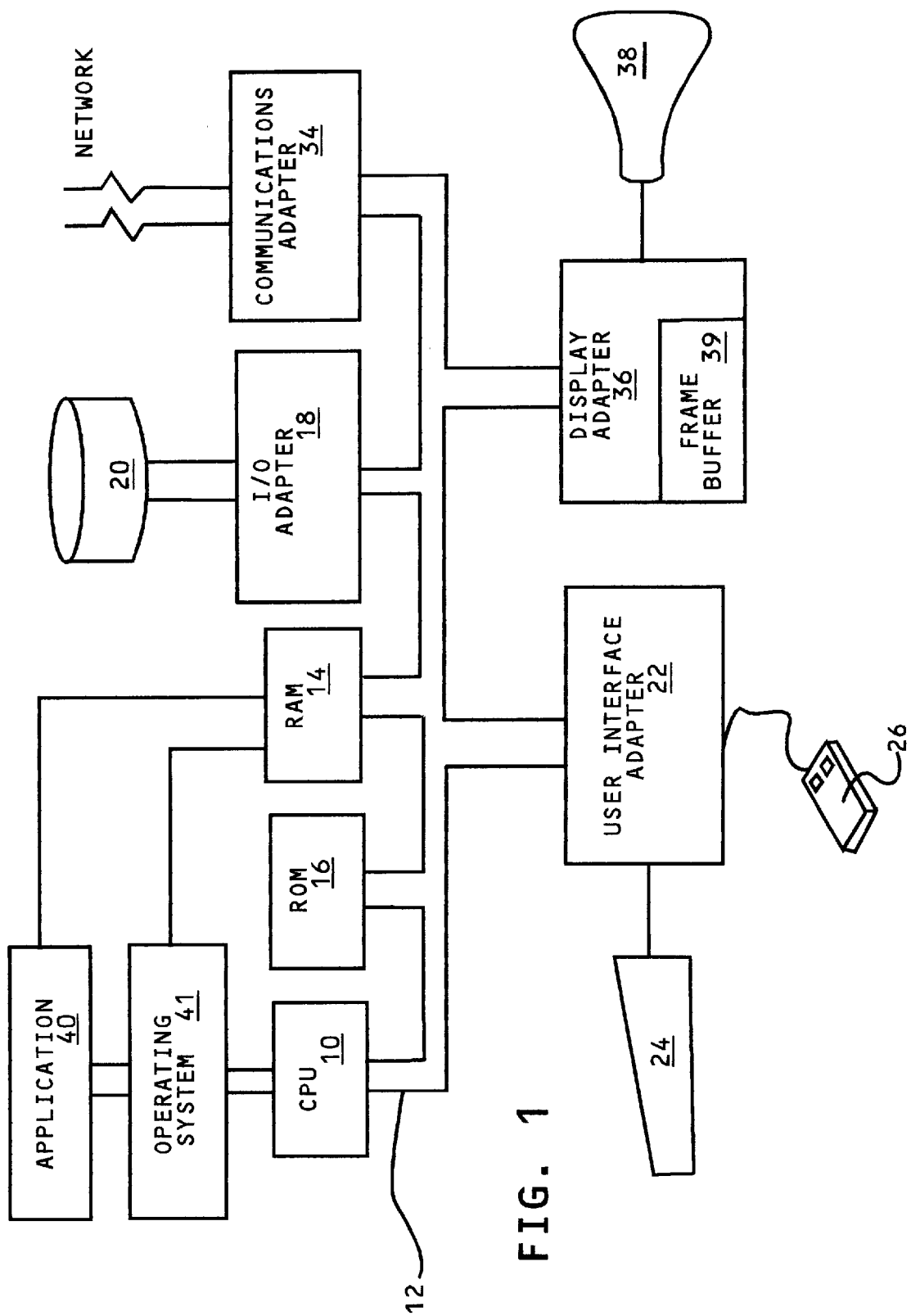
FIG. 1 is a block diagram of a data processing system including a central processing unit and network connections via a communications adapter which is capable of implementing the receiving display station through which the Web job listings may be searched for in accordance with the present invention.

Referring to FIG. 1, a typical data processing terminal is shown which may function as the Web display stations used for conducting the Web searches for identifying competitors' customers through job listing databases.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX operating system available from IBM; Microsoft's WindowsMe™ or Windows 2000™, as well as various other UNIX and Linux operating systems. Application programs 40, controlled by the system, are moved into and out of the main memory Random Access Memory (RAM) 14. These programs include the programs of the present invention for Web browsing and interacting with search engine functionality. Search arguments for identifying competitors' customers are entered through the pages these search engines present to the Web browser or via command interfaces. The search programs are carried on servers to which the Web display station is communicating via the Internet. Any conventional Web browser, such as the Netscape Navigator™ or Microsoft's Internet Explorer™, as will hereinafter be described, may be used on the Web display station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since the major aspect of the present invention is directed to Web pages transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Web documents are conventionally implemented in HyperText Markup Language (HTML) language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly pp. 637–642, on HTML in the formation of Web pages.

In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* particularly in Chapter 19, pp. 419–454, on the Netscape Navigator; in Chapter 20, pp. 455–494, on the Microsoft Internet Explorer; and in Chapter 21, pp. 495–512, covering Lynx, Opera and other browsers.

The invention involves the use of search engines for searching. As described in the above-mentioned *Internet: The Complete Reference, Milleniun Edition*, pages 395 and 522–535, search engines use keywords and phrases to query the Web for desired subject matter. Usually the keywords are combined with some of the basic Boolean operators, i.e. AND, OR and NOT, in designing Web queries. Each search engine has its own well developed syntax or rules for combining such Boolean operators with the keywords to conduct the searches. The search engine usually uses a search agent called a "spider" that looks for information on Web pages. Such information is indexed and stored in a vast database. In carrying out its search, the search engine looks through the database for matches to keywords subject to the engine syntax. In the present invention, the search engine then presents to the user a list of the Web pages it had determined to have the job listings sought in the requested query that contain job listings including the competitors' name or products. Some significant search engines are: AltaVista, Infoseek, Lycos, Magellan, Webcrawler and Yahoo.

Figure 2:
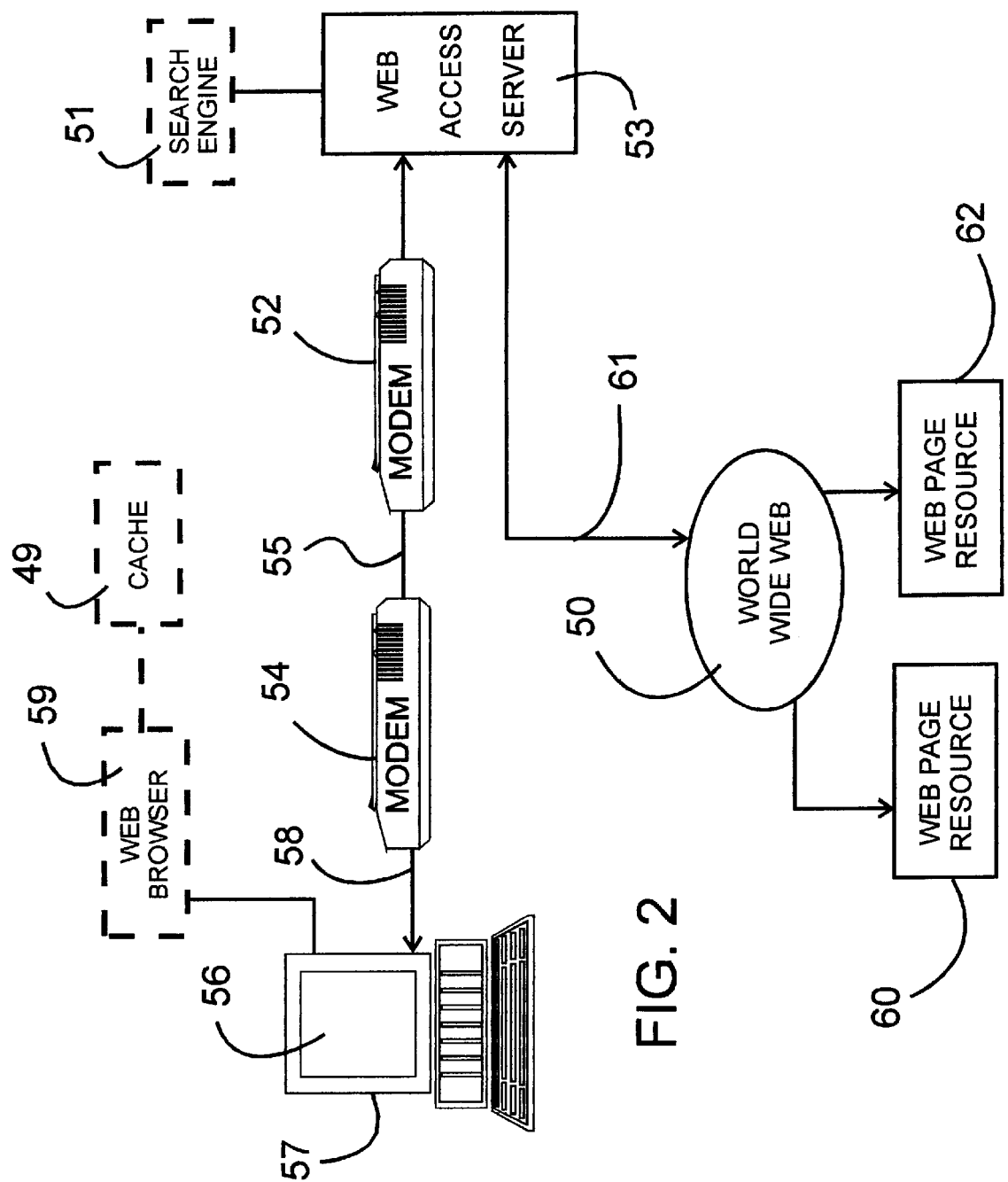
FIG. 2 is a generalized diagrammatic view of a Web portion upon which the present invention may be implemented.

A generalized diagram of a portion of the Web that the computer controlled display terminal 57 used for Web page receiving during searching or browsing is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56 which is one of a sequence of Web pages containing embedded hyperlinks to other Web pages.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 to control the communication with the Web access server 53 to thereby download and display the accessed Web pages 56 on terminal 57. The Web access server 53 uses one of the previously described search engines 51 to access via the Web 50 the desired sequence of Web pages from appropriate Web resources such as databases 60 and 62.

Figure 3:
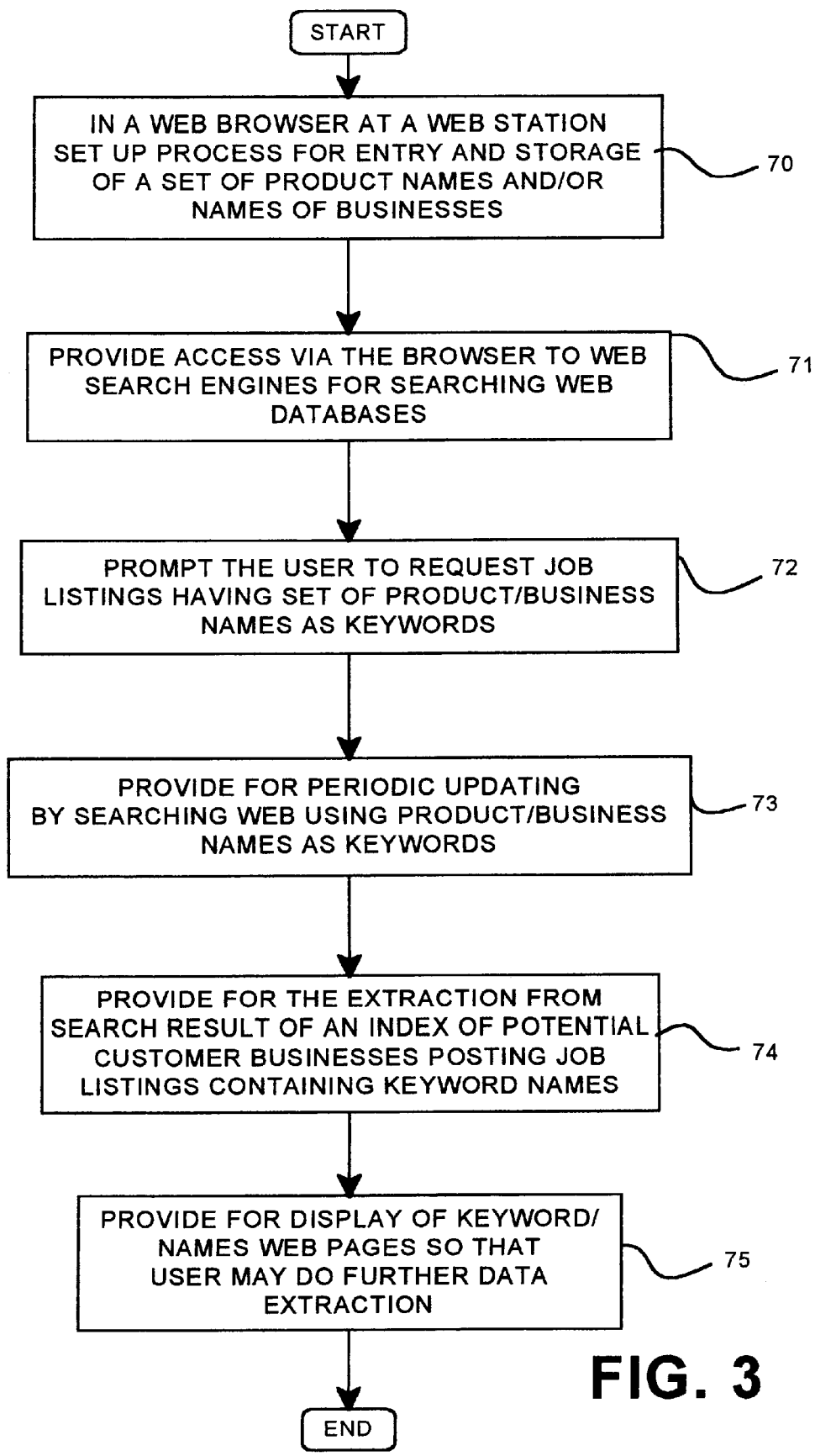
Figure 4:
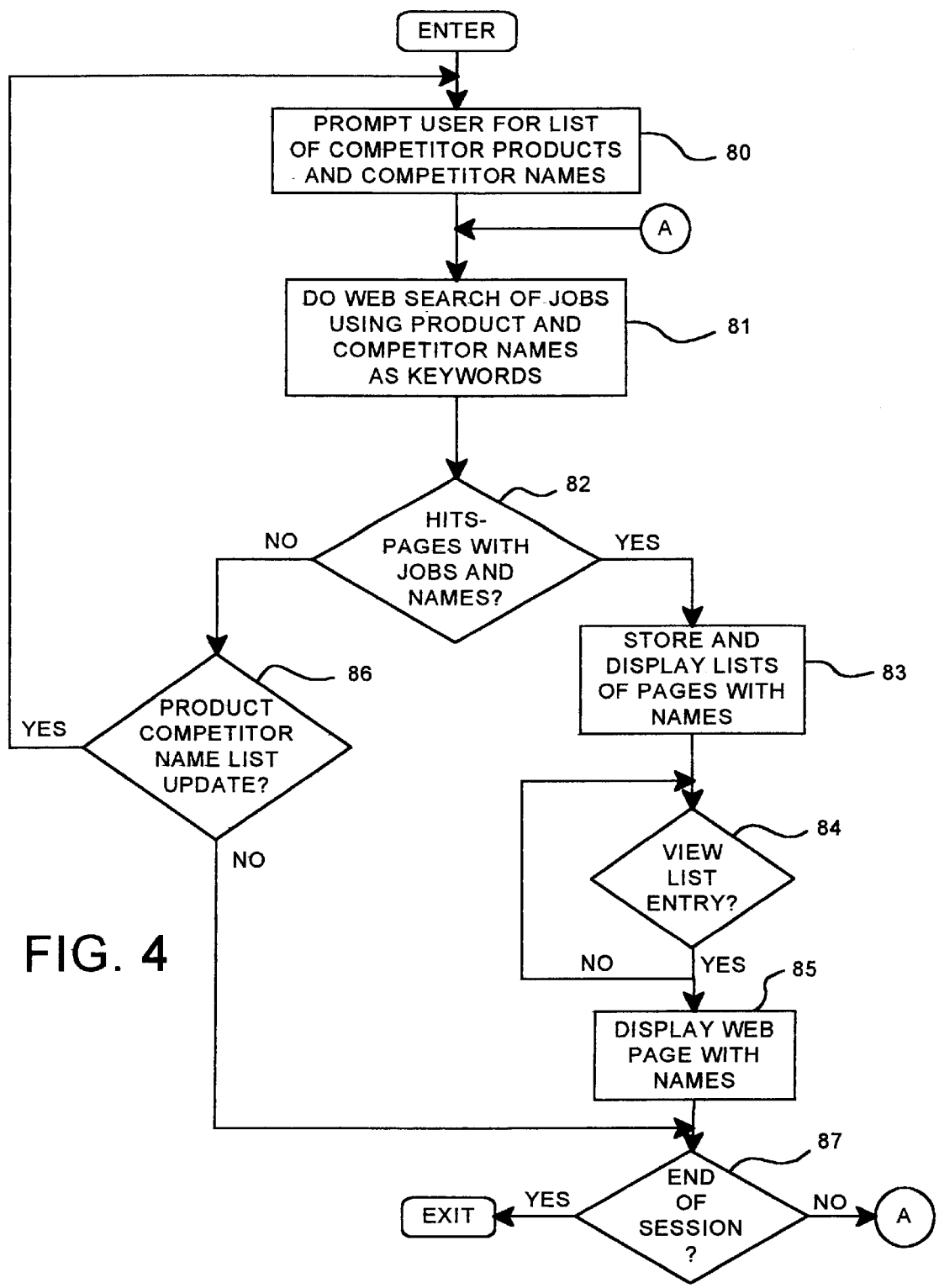
FIG. 4 is a flowchart of an illustrative run of the process setup in FIG. 3.

With this setup, the present invention will subsequently be described in greater detail with respect to FIGS. 3 and 4. With reference to FIG. 3, there is setup in a Web browser associated with a receiving display station on the Web, a process for the entry and storage of a set of product names and/or names of businesses, step 70. These names and products are target names or products, i.e. the names of the competitive products and the names of the competitive companies whose customer lists the user of the process wishes to compile. Access is provided via the browser to search Web databases via the above-described search engines for searching Web databases for job listing the competitors names and their product names as keywords, step 71. There is provision in the process for prompting the user to request job listings on the Web through Web searches which will be pertinent to particular products and vendors' names of which he is trying to get the names of customers, step 72. The user may have or be developing similar products for which the customers may have an interest.

Means are provided for the periodical updating of the searches on a regular basis to discover whether there are new job listings which may be pertinent, step 73. In other words, the process may be set up so that there is stored at the Web browser, a list of vendor names and product names which the user is periodically prompted to update, the search using the same keywords is periodically repeated. Once the search is completed and the Web pages or documents having the keyword vendor and product names are found, the list of pages are presented to the user to permit him to extract additional pertinent information, step 75, after the user has extracted his basic information. e.g. the potential customer businesses posting the listings, step 74. Such additional pertinent information may be the size of the customer, location of the needs for the competitors' products as well potential people in the potential customers' business who may be good contacts.

The running of the process set up in FIG. 3 will now be described with respect to the flowchart of FIG. 4. The user is prompted for a list of competitors' names and competitive products' names, step 80. A Web search of jobs using product and competitors' names as keywords, step 81, is carried out. Then, a determination is made as to whether there have been any hits, i.e. Web pages with job listings including the names of either the keyword products or keyword business names, step 82. If No, then no further action need be taken until there is a need for a further update of the list of competitive products' names or business names as determined in decision step 86. If the determination from step 86 is Yes, there is a need for such an update, then the process is returned to initial step 80 and the user is prompted for a further update of the keyword names. Returning now to step 82, if the determination is Yes, there have been Hits on the job listings of Web pages with the competitive business/product names, then such Web pages are stored and an index of such stored pages is displayed as required by the user. This index of Web pages, representing the Web pages of the potential customers, may conveniently be stored along with the Hit Web pages in the browser cache 49, FIG. 2, so that the user may choose to display or view the list, step 84, to mine information relative to the potential customers as described above with respect to the company or business which made the job listing in the Web page. If Yes, the user chooses to display a selected Web page from the index of stored pages, the selected Web page is displayed, step 85. The user may then do further data mining as described above. At this point, or after a No decision from step 86, a determination may conveniently be made as to whether this session is at an end, step 87. If Yes, then the session is exited. If No, the process may be returned to step 81 via branch "A" and another Web search may be carried out using the list of competitor product names or business names.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A business method for identifying business competitors' customers through world Wide Web (Web) searching comprising:

entering into a computer controlled display station on the Web, a set including business competitors' names and/or business competitors' product names;

conducting a search through said display station of job listing databases on the Web using said set of names as keywords;

extracting from the results of said searching, on said display station, an index of employers, other than the business competitors themselves, posting job listings including names from said set; and storing said index of employers as potential customers.

2. The business method of claim 1 wherein said set includes business competitors' names.

3. The business method of claim 1 wherein said set includes business competitors' product names.

4. The business method of claim 1 further including the step of extracting, from the Web pages posting said job listings of said employers, additional information relative to doing business with said potential customers.

5. The business method of claim 4 wherein said additional information includes the employer locations posting said job listings to thereby identify customer locations with the competitors' product needs.

6. The business method of claim 4 wherein said additional information includes the quantity of the jobs posted in said job listings to thereby quantify the potential customers' product needs.

7. The business method of claim 4 wherein said additional information includes the names of people within the potential customers' organization having job needs to thereby identify potential contact people within the organization.

8. A computer program having code recorded on a computer readable medium for identifying business competitors' customers through Web searching comprising:

- means for entering into a computer controlled display station on the Web, a set including business competitors' names and/or business competitors' product names;
- means for conducting a search through said display station of job listing databases on the Web using said set of names as keywords;
- means for extracting from the results of said searching, on said display station, an index of employers, other than the business competitors themselves, posting job listings including names from said set; and
- storing said index of employers as potential customers.

9. The computer program of claim 8 wherein said set includes business competitors' names.

10. The computer program of claim 8 wherein said set includes business competitors' product names.

11. The computer program of claim 8 further including means for extracting, from the Web pages posting said job listings of said employers, additional information relative to doing business with said potential customers.

12. The computer program of claim 11 wherein said additional information includes the employer locations posting said job listings to thereby identify customer locations with the competitors' product needs.

13. The computer program of claim 11 wherein said additional information includes the quantity of the jobs posted in said job listings to thereby quantify the potential customers' product needs.

14. The computer program of claim 11 wherein said additional information includes the names of people within the potential customers' organization having job needs to thereby identify potential contact people within the organization.

* * * * *